(12) United States Patent
Clark et al.

(10) Patent No.: US 8,051,417 B2
(45) Date of Patent: Nov. 1, 2011

(54) TARGET THREAD SELECTION IN A MULTI-THREADED PROCESS

(75) Inventors: Elizabeth An-Li Clark, Los Gatos, CA (US); Edward J. Sharpe, Los Gatos, CA (US); William Pohl, Morgan Hill, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1311 days.

(21) Appl. No.: 11/700,744

(22) Filed: Jan. 30, 2007

(65) Prior Publication Data

US 2008/0184232 A1 Jul. 31, 2008

(51) Int. Cl.
*G06F 9/46* (2006.01)
*G06F 13/24* (2006.01)

(52) U.S. Cl. ........ 718/100; 718/101; 718/102; 710/260; 710/261; 710/262

(58) Field of Classification Search .................. 718/102, 718/100, 101, 107; 710/260, 261, 262
See application file for complete search history.

(56) References Cited

U.S. PATENT DOCUMENTS

| 5,991,790 | A | * | 11/1999 | Shah et al. | ..................... 718/100 |
| 2002/0116538 | A1 | * | 8/2002 | Chen et al. | ..................... 709/314 |
| 2004/0139432 | A1 | * | 7/2004 | Bender et al. | ................. 718/100 |
| 2004/0194093 | A1 | * | 9/2004 | Koutharapu et al. | ......... 718/100 |
| 2005/0066096 | A1 | | 3/2005 | Ruemmler et al. | |

OTHER PUBLICATIONS

Mueller "A Library Implementation of POSIX Threads under UNIX", Proceedings of the USENIX Conference (Jan. 1993), pp. 28-42.*

* cited by examiner

*Primary Examiner* — Emerson Puente
*Assistant Examiner* — Willy W Huaracha

(57) ABSTRACT

In an embodiment of the invention, an apparatus and method for a target thread selection in a multi-threaded process perform the steps of receiving a signal that may or may not be masked by threads in the process; and searching a thread subset for a target thread that can handle the signal. A signal daemon may search for the target thread if the target thread is not found in the thread subset.

15 Claims, 2 Drawing Sheets

TARGET THREAD SELECTION IN A MULTI-THREADED PROCESS

TECHNICAL FIELD

Embodiments of the invention relate generally to target thread selection in a multi-threaded process.

BACKGROUND

A process is a running instance of a software program including all variables and sequences of process states. A process may have many software threads which are threads of execution. Threads are a way for a program to split itself into two or more simultaneously (or pseudo-simultaneously) running tasks (i.e., execution paths through address space). A signal is an example of an inter-process communication that occurs between processes. The task of selecting a software thread to handle a signal can be time consuming if the process associated with the thread has a large number of threads.

Several prior solutions have been implemented to attempt to solve the problem of performing excessively long (time consuming) thread searches for finding candidate threads for signal delivery. The first prior solution created a per-process signalable thread list (i.e., list of threads that could handle signals on a per-process basis). This solution searches only threads on that thread list as candidates for signal delivery signal, instead of searching the entire per-process thread list. A problem with this prior solution is that this per-process signalable thread list would not be significantly shorter or less than the entire per-process thread list if most of the threads of the process were signalable. Therefore, this solution could also result in the time consuming thread searches and wasted processor cycles due to the searches. Additionally, this prior solution was designed to only benefit particular processes which had mostly non-signalable threads (i.e., threads that do not handle signals such as system threads) in the per-process thread list.

A second prior solution used a signal bit mask in the process structure to mark signals that were completely blocked by the process. A process would have a signal bit set for a particular signal that no threads in the process could handle (i.e., a particular signal that was masked by all the threads). This saved the sender the cost of searching the thread list for a completely blocked signal. It also avoided having each thread in the process searching other threads (in the process) that could instead handle this particular masked signal. This prior solution was intended to stop the repeated (and often unnecessary) searches for candidate (target) threads for handling the signals which were masked off by every thread in a heavily threaded process. Like the above-mentioned first prior solution, the problem with this second prior solution was that this second solution was tuned to fix a particular customer application. In this case, the application constantly sends signals to processes with a large number of threads which had the signals masked off, and the threads are required to search for other threads that are capable of handling the signal that the running thread itself has masked off. Furthermore, the per-process signal bit mask may involve very frequent resets and still require a full thread list search to maintain up to date values. Therefore, this solution could also result in the time consuming thread searches and wasted processor cycles due to the searches.

Therefore, the current technology is limited in its capabilities and suffers from at least the above constraints and deficiencies.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments of the invention.

Figure 1:
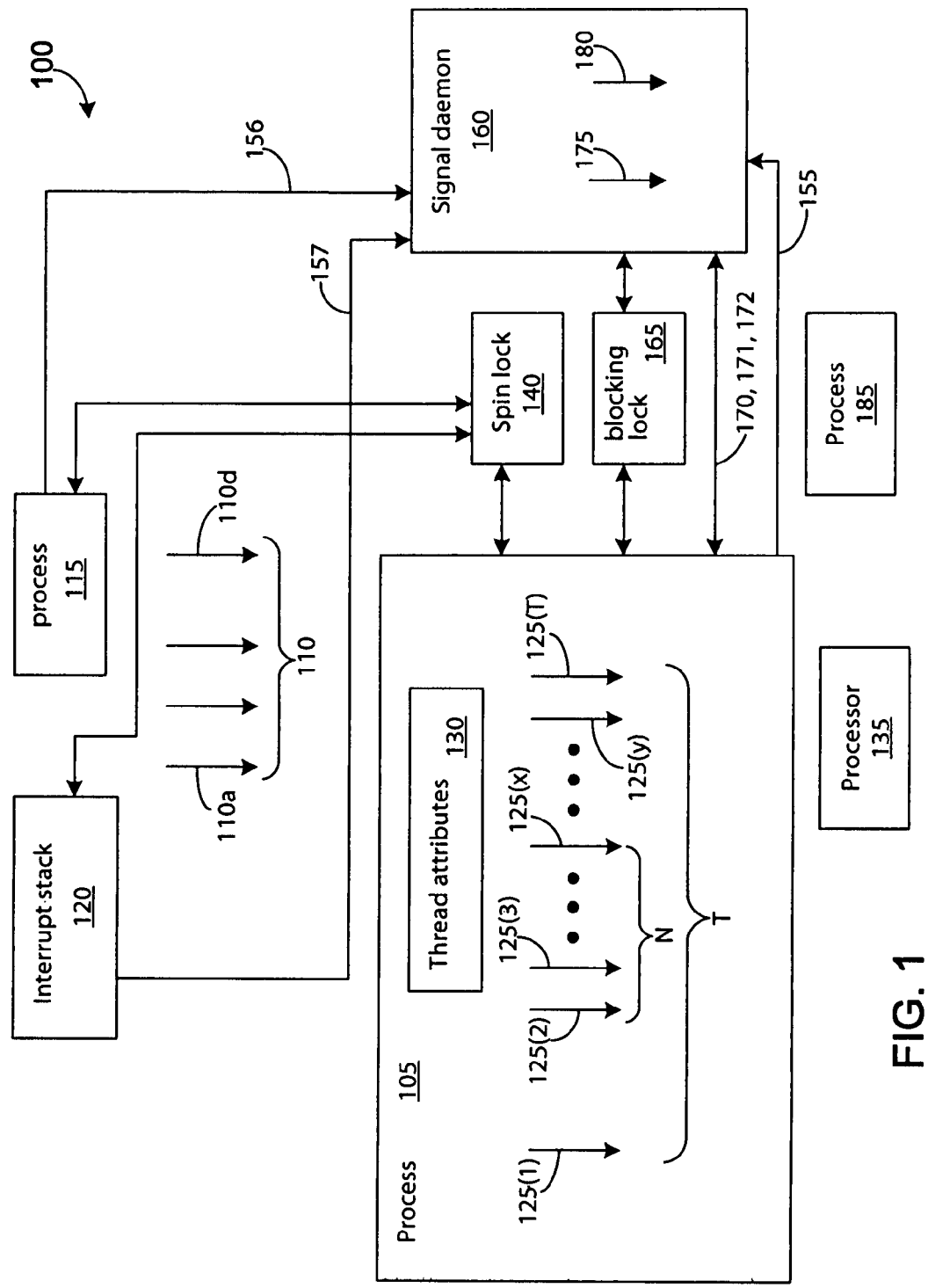
FIG. 1 is a block diagram of an apparatus (system) in accordance with an embodiment of the invention.

FIG. 1 is a block diagram of an apparatus (system) 100 in accordance with an embodiment of the invention. A process 105 receives one or more signals 110. Alternatively, the process 105 is transmitting one or more signals 110 within the process 105 itself. As known to those skilled in the art, a process is a running instance of a software program including all variables and the sequences of process states. As also known to those skilled in the art, a signal 110 can be, for example, a communication or message from another process 115 to the process 105, a communication or message occurring within the process 105 itself, or a message initiated from an event on an interrupt stack 120. The signals 110 can be other suitable types of inter-process communications that are developed as computer technology advances. Typically, interrupts are generated by various computer hardware devices in order to request services or to report and/or handle problems. An interrupt permits the execution of one process to be interrupted in order to handle an alternative execution stream.

The process 105 has multiple threads (generally referred to as threads 125) which are threads of execution. Therefore, the process 105 is multi-threaded. In the example of FIG. 1, the process 105 has T number of threads (threads 125(1) to 125(T), where T can be any suitable integer number (e.g., T=1000 or other number) that indicates the total number of threads of the process 105. Typically, the thread attributes 130 in the process 105 configures the particular signals that are masked by each thread 125. Various known methods are known to those skilled in the art for masking of signals by threads.

As an example, if a particular signal 110a is masked by the thread 125(1), as configured by the thread attributes 130, then that signal 110a will not be delivered to that particular thread 125(1). In accordance with an embodiment of the invention, for signals 110a that are delivered to the process 105, the sender process (which can be the same as the target process, i.e. process 105, or a different process 115) will check an N number of threads if the signal 110a can be delivered to any of the N threads for processing by the process 105. The number N can be any suitable integer number (e.g., N=16). The number N may be set arbitrarily to favor certain attributes that may be affected by architecture. If N is lower, interrupt latency may be improved, whereas if N is higher it may reduce the total processor cycles consumed while increasing interrupt latency. In the example of FIG. 1, the N threads are shown as threads 125(2), 125(3), through 125(x) where x can be any value for different examples.

In the prior implementation, other threads 125 that have masked the signal 110a will check an T−1 (where T is the number of threads in process 105) number of other threads if they can handle the masked signal 110a. For example, if the thread 125(2) has also masked the signal 110a, then the thread 125(2) will check an T-1 number of other threads 125 to determine a candidate (target) thread that can handle the signal 110a. These searches have been advantageously eliminated in the current embodiments of the invention.

When the sender process 105 or 115 is searching the N threads 125 for a candidate thread to handle the signal 110a, the sender of the signal 110a will obtain the spinlock 140. If the process 105 is the sender, then process 105 will obtain a spinlock 140. If the process 115 is the sender, then the process 115 will obtain the spinlock 140. When a process obtains the spinlock 140, that process will not be able to receive and service an interrupt (e.g., interrupt 110d in the FIG. 1 example). Typically, the spinlock will have a bit value (logical "1" or logical "0") that is set by the process when the process has ownership of the spinlock. While a process has the spinlock 140, any other processes attempting to lock it waits in a loop ("spins"). The spinlock 140 will not be released until thread 125(1) has finished its thread search and checking if any of the N threads can handle the signal 110a. Therefore, the spinlock 140 is a system-wide lock that limits access to components in the system 100 while the lock is being held. Minimizing the amount of time that spinlock 140 is held will allow greater throughput of activities in the system 100.

If the sender process 105 or 115 finds a thread in the N thread subset that can handle the signal 110a, then the process 105 has finished searching the N thread subset and will then release the spinlock 140. As a result of releasing the spinlock 140, the process 105 or 115 can again receive and service an interrupt. Assume, in this example, that the sender process 105 or 115 has determined that the thread 125(x) in the N thread subset can handle the signal 110a. Therefore, the signal 110a is then delivered to the thread 125(x) and the process 105 or 115 is done with delivering this signal.

As another example, if the sender process 105 or 115 does not find a thread in the N thread subset that can handle the signal 110a, then the process 105 or 115 will release the spinlock 140 after completing the search of the N thread subset. As a result of releasing the spinlock 140, the sender process 105 or 115 can again receive and service an interrupt. In an embodiment of the invention, if the process 105 does not find a thread in the N thread subset that can handle the signal 110a, the process 105 can invoke 155 a signal daemon 160 to continue searching for a candidate thread (in the thread list T) that can handle the signal 110a. If the sender of signal 110a is another process 115, then that process 115 will instead invoke 156 the signal daemon 160 to continue to search for a candidate thread in the thread list (T). If the sender is interrupt stack 120, it is also capable of invoking the signal daemon 160 through 157 to continue the search for a candidate thread in the thread list (T).

The signal daemon 160 will continue to search for a candidate thread (in the thread list T) that can handle the signal 110a. The signal daemon 160 is a program that will handle the request 155 from the process 105 (or request 156 from process 115, or request 157 from interrupt stack 120) to find a candidate thread to handle the signal 110a. When the signal daemon 160 is searching for a candidate thread, the signal daemon 160 obtains a blocking lock 165 which will not prevent the process 105 from servicing an interrupt 110d. The blocking lock 165 is a per-process blocking lock that will not block other requests in the system 100. Since the signal daemon 160 is not required to hold the system-wide spinlock 140 when searching the thread list (T), the process 105 can advantageously service an interrupt 110d when the signal daemon 160 is searching its thread list (T). The signal daemon 160 performs the thread search in its own context separate from signal delivery, and can therefore hold the blocking lock 165 instead of a spinlock 140.

If the signal daemon 160 determines that there is a thread that can handle the signal 110a (e.g., candidate thread 125(*y*)), the signal daemon 160 resends the signal 110a to candidate thread 125(*y*) through 170. If another process 115 is the sender of the signal 110a, then the signal daemon 160 can resend the signal 110a to thread 125(*y*) through 171. If the interrupt stack 120 is the sender of the signal 110a to the process 105, the signal daemon 160 resends the signal 110a to the candidate thread 125(*y*) through 172. For purposes of clarity in the drawings, the signals 170, 171, and 172 are denoted in FIG. 1 as a single line between process 105 and signal daemon 160.

The signal 170, 171, or 172 is sent to the thread 125(*y*) or another candidate thread. The signal daemon 160 then releases the blocking lock 165 after completing the search of a candidate threads. The candidate thread 125(*y*) then holds the spinlock 140 in order to find the signal 110a which was sent to it as a thread directed signal, and for the candidate thread 125(*y*) to handle the signal 110a.

Note that if the signal daemon 160 does not find a candidate thread, the signal is also left for the process 105 to handle.

Since the candidate thread 125(*y*) has been identified to the process 105 by the signal daemon 160, process 105 will not spend any time searching for a candidate thread in the thread list and as a result the amount of time that the process 105 will hold the spinlock 140 is advantageously shortened. Therefore, the amount of time that the process 105 is not able to service interrupts 110d is advantageously shortened.

When delivering a signal 110, the traversal of the entire thread list (T) to find a destination thread can be a very time consuming step in prior methods. In prior methods, while holding spinlocks 140, the entire thread list (T) is searched to find a thread which is interruptible and does not have the signal masked. If a process has a large number of threads which have the signal masked off, prior methods will require a very long time to find a candidate thread. In contrast, the above method provides a method to limit the search to the N subset of threads and to permit the signal daemon 160 to search the remaining threads in the thread list (T) if a candidate thread is not found in the N subset of threads.

The signal daemon is helpful for heavily threaded processes to handle signals. The task of selecting a thread to handle a signal can be time consuming if the process has a large number of threads. By having the signal daemon allocated to perform this task, the time spent in signal delivery with spinlocks held, and thus, interrupts disabled, can be advantageously reduced.

Note that in an embodiment of the invention, the signal daemon 160 includes, for example, multiple threads 175(1) through 175(n), where n can equal 2 or greater, for searching a candidate thread in a process 105 and other additional processes such as 185, and informing the processes of the candidate thread(s). Typically, the signal daemon 160 has threads created at boot time for the sole purpose of assisting other processes with their signal handling as discussed in the methods above.

Since signals can be sent from outside process context and from the interrupt stack, prior methods require that spinlocks be held for the entire thread list search duration until it is posted at its target. As the spinlock 140 is system-wide spinlock instead of a per process spinlock, there can be much contention for this spinlock 140 if signals are sent frequently to a process. As discussed above, offloading the thread search tasks to the signal daemon 160 advantageously reduces contention on the spinlocks 140.

The signal daemon 160 can be programmed by use of standard programming languages (e.g., C, C++, or other suitable languages) and may be programmed by use of standard programming techniques.

Figure 2:
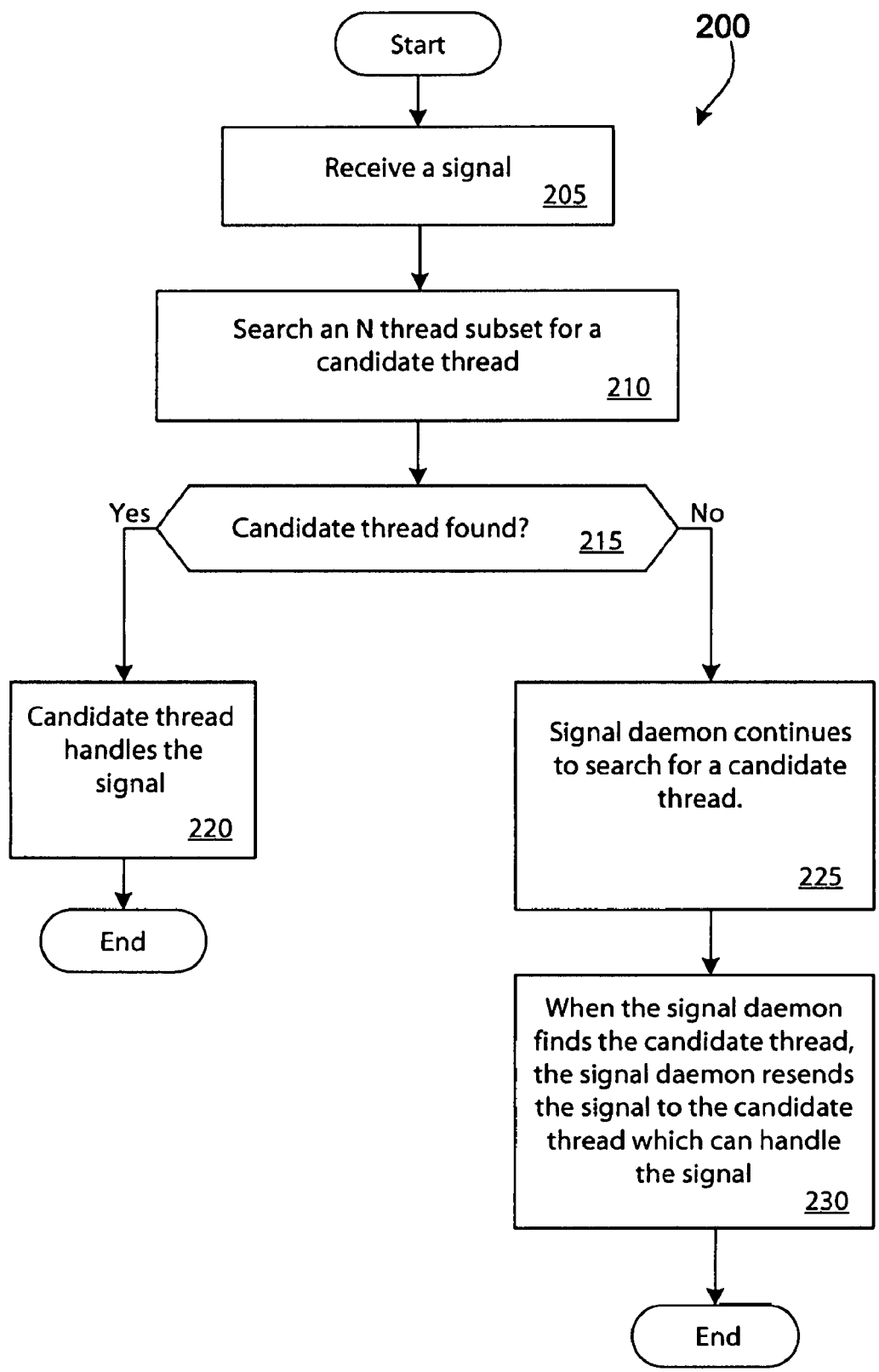
FIG. 2 is a flow diagram of a method in accordance with an embodiment of the invention.

FIG. 2 is a flow diagram of a method 200 in accordance with an embodiment of the invention. In block 205, a signal is received by the process. The signal can be received from another process or can be a signal that is transmitting within the process itself. The sender of the signal will search, in block 210, an N thread subset for a candidate (target) thread that can handle the signal.

In block 220, if a candidate thread is found in the N thread subset then the candidate thread handles the signal.

In block 215, if a candidate thread is not found in the N thread subset (e.g. because all N threads were in a state not suitable for signal handling, or have the signal masked), then in block 225, the signal daemon 160 (FIG. 1) continues to search for a candidate thread in the thread list (T).

In block 230, when the signal daemon finds the candidate thread, the candidate thread (will handle the signal. The signal is resent by the signal daemon 160 to the process as a thread directed signal, and the candidate thread will then handle the signal for the process.

It is also within the scope of the present invention to implement a program or code that can be stored in a machine-readable or computer-readable medium to permit a computer to perform any of the inventive techniques described above, or a program or code that can be stored in an article of manufacture that includes a computer readable medium on which computer-readable instructions for carrying out embodiments of the inventive techniques are stored. Other variations and modifications of the above-described embodiments and methods are possible in light of the teaching discussed herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method for a target thread selection in a multi-threaded process, the method comprising:
    receiving a signal, at said multi-threaded process, that may or may not be masked by threads in a thread list of said multi-threaded process;
    searching, by said multi-threaded process or another process, a thread subset of said thread list for a target thread that can handle the signal;
    in response to said searching, receiving a spinlock;
    in response to completion of said searching said thread subset for said target thread, releasing said spinlock; and
    searching remaining threads in said thread list, for said target thread, by a signal daemon, if said target thread is not found in said thread subset, by said multi-threaded process or another process.

2. The method of claim 1, wherein the signal daemon eliminated the necessity for threads to search for a target thread within the multi-threaded process, if the target thread was unable to handle the signal itself as the signal was masked.

3. The method of claim 1, further comprising: holding a per-process blocking lock when searching for the target thread in the other threads in the thread list.

4. The method of claim 1, further comprising: handling the signal by the target thread.

5. The method of claim 1, wherein the multi-threaded process can service an interrupt when the signal daemon is searching for the target thread.

6. The method of claim 1, further comprising: if a target thread is not found, then handling the signal by the multi-threaded process.

7. The method of claim 1, further comprising: if the signal daemon does not find a target thread, then handling the signal by the multi-threaded process.

8. An article of manufacture comprising:
    a non-transitory machine-readable medium having stored thereon instructions to:
    receive a signal, at a process, that may or may not be masked by threads in a thread list of said process;
    search, by said process or another process, a thread subset of said thread list for a target thread that can handle the signal;
    in response to said searching, receiving a spinlock;
    in response to completion of said searching said thread subset for said target thread, releasing said spinlock; and
    searching remaining threads in said thread list for said target thread, by a signal daemon, if said target thread is not found in said thread subset by said process or another process.

9. A computer system for a target thread selection in a multi-threaded process, the computer system comprising:
    a processor;
    a multi-threaded process for receiving or processing a signal that may or may not be masked by threads in a thread list of said multi-threaded process;
    a sender for searching a thread subset of said thread list for a target thread that can handle the signal, receiving a spinlock in response searching said thread subset for said target thread, and releasing said spinlock in response to completion of said searching said thread subset for said target thread; and
    a signal daemon for searching the remaining threads in said thread list for said target thread if said target thread is not found in said thread subset by said sender.

10. The computer system of claim 9, wherein the signal daemon eliminates the necessity for threads to search for a target thread within the multi-threaded process, if the target thread was unable to handle the signal itself as the signal was masked.

11. The computer system of claim 9, wherein the signal daemon holds a per-process blocking lock when searching for the target thread in the other threads in the thread list.

12. The computer system of claim 9, wherein the signal is handled by the target thread.

13. The computer system of claim 9, wherein the multi-threaded process can service an interrupt when the signal daemon is searching for the target thread.

14. The computer system of claim 9, wherein if a target thread is not found, then the signal is handled by the multi-threaded process.

15. The computer system of claim 9, wherein if the signal daemon does not find a target thread, then the signal is handled by the multi-threaded process.

* * * * *